(12) United States Patent
Pi et al.

(10) Patent No.: US 7,783,322 B2
(45) Date of Patent: Aug. 24, 2010

(54) MOBILE COMMUNICATION DEVICE WITH NETWORK SELECTION AND METHOD FOR SAME

(75) Inventors: Lei Pi, Shenzhen (CN); Tsung-Fu Huang, Shenzhen (CN); Shu-Ken Lin, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1191 days.

(21) Appl. No.: 11/308,056

(22) Filed: Mar. 4, 2006

(65) Prior Publication Data

US 2007/0072595 A1    Mar. 29, 2007

(30) Foreign Application Priority Data

Sep. 16, 2005  (CN) .............................. 94 1 32087

(51) Int. Cl.
*H04M 1/00* (2006.01)
*H04B 1/04* (2006.01)

(52) U.S. Cl. ................................ 455/552.1; 455/127.4

(58) Field of Classification Search ................. 455/551, 455/552.1, 435.2
See application file for complete search history.

(56) References Cited

U.S. PATENT DOCUMENTS

| 7,376,112 B2 * | 5/2008 | Liu ............................ 370/338 |
| 2002/0132636 A1 * | 9/2002 | Stockhusen .................. 455/553 |
| 2004/0081141 A1 * | 4/2004 | Chen et al. .................. 370/352 |
| 2004/0165572 A1 * | 8/2004 | Park ........................... 370/349 |
| 2004/0235455 A1 | 11/2004 | Jiang |
| 2006/0229098 A1 * | 10/2006 | LaBauve et al. ......... 455/552.1 |

\* cited by examiner

*Primary Examiner*—Michael T Thier
(74) *Attorney, Agent, or Firm*—Wei Te Chung

(57) ABSTRACT

A network selection method automatically selects a communication network for a multi-mode mobile communication device, which has operability in two or more communication networks. Plural of digit map strings and a network priority setting are provided and stored in the mobile communication device. An input phone number is compared with all the digit map strings to obtain a match result. A communication network is selected by the mobile communication device among two or more communication networks based on a current network status, the match result, and the network priority setting.

19 Claims, 6 Drawing Sheets

| Network priority setting | | Prefer GSM | | Prefer VOIP | |
|---|---|---|---|---|---|
| Match result | | Yes | No | Yes | No |
| Network status | GSM: out of service<br>VOIP: out of service | Fail | Fail | Fail | Fail |
| | GSM: in service<br>VOIP: out of service | GSM | GSM | GSM | GSM |
| | GSM: in service<br>VOIP: in service | GSM | GSM | GSM | VOIP |
| | GSM: out of service<br>VOIP: in service | VOIP | VOIP | VOIP | VOIP |

FIG. 4

MOBILE COMMUNICATION DEVICE WITH NETWORK SELECTION AND METHOD FOR SAME

FIELD OF THE INVENTION

The invention relates to a wireless communication device, and particularly to a multi-mode mobile communication device which can automatically select a preferable communication system from different available communication systems.

DESCRIPTION OF RELATED ART

The increase in mobile phone users has resulted in a number of service problems. For example, system overload is known to cause problems such as calls to going off-line, crosstalk, poor voice quality, and difficulties associated with accessing the network. Mobile phone manufacturers have begun to design and manufacture dual mode mobile phones in an endeavor to solve these service problems.

A typical dual mode mobile phone can operate using two different kinds of communication networks. For example, a dual mode mobile phone can be associated with a circuit-switching based communication network such as a Global System for Mobile communication (GSM) network and a packet-switching based communication network such as a Voice Over Internet Protocol (VOIP) network. Thus, a GSM/VOIP dual mode mobile phone is a mobile phone that can operate using both GSM and VOIP networks. Users of the GSM/VOIP dual mode mobile phones manually select one of the two communication networks for phone service according to a network's status. For instance, when the GSM network is in service and the VOIP network is out of service, users can manually select the GSM network.

However, such dual mode mobile phones requiring manual selection of communication networks do not necessarily work well when the service status of the chosen communication network changes. For example, if the GSM is initially selected and then the GSM network goes out of service, the dual mode mobile phone would not be operational even if the VOIP network is in service. Thus, the dual mode mobile phone loses communication ability because it cannot automatically change to an available communication network. Therefore, it is desired to provide a dual mode mobile phone that can automatically select a communication network that is in service.

SUMMARY OF INVENTION

One exemplary embodiment of the present invention provides a mobile communication device. The mobile communication device includes a match determining module and a selection module. The match determining module is configured to receive an input phone number and compare the input phone number to a plurality of digit map strings stored within the mobile communication device. The selection module is configured to select a communication network among a plurality of different communication networks if the input phone number matches one of the plurality of digit map strings.

Another exemplary embodiment of the present invention provides a mobile communication device that selects a communication network from a plurality of different communication networks. The mobile communication device includes a storage module, a transceiver module, a match determining module, and a selection module. The storage module is provided for storing a plurality of digit map strings and a network priority setting. The transceiver module is provided for receiving an input phone number and a current network status. The match determining module is provided for determining a match result between the input phone number and the digit map strings. The selection module is provided for selecting a communication network among the plurality of different communication networks according to the network priority setting, the match result, and the current network status.

Still another exemplary embodiment of the present invention provides a method for selecting a communication network from a plurality of different communication networks. The method includes the steps of: providing a plurality of digit map strings and a network priority setting; receiving an input phone number; acquiring the network priority setting; determining a match result according to the input phone number and the plurality of digit map strings; receiving a current network status; and selecting a communication network according to the network priority set, the match result, and the current network status.

Other advantages and novel features will be drawn from the following detailed description of preferred embodiments with the attached drawings.

BRIEF DESCRIPTION OF DRAWINGS

FIG. 4 is a table showing an exemplary network selecting rule for selecting a communication network for the dual mode mobile communication device of the exemplary embodiments.

DETAILED DESCRIPTION

Figure 1:
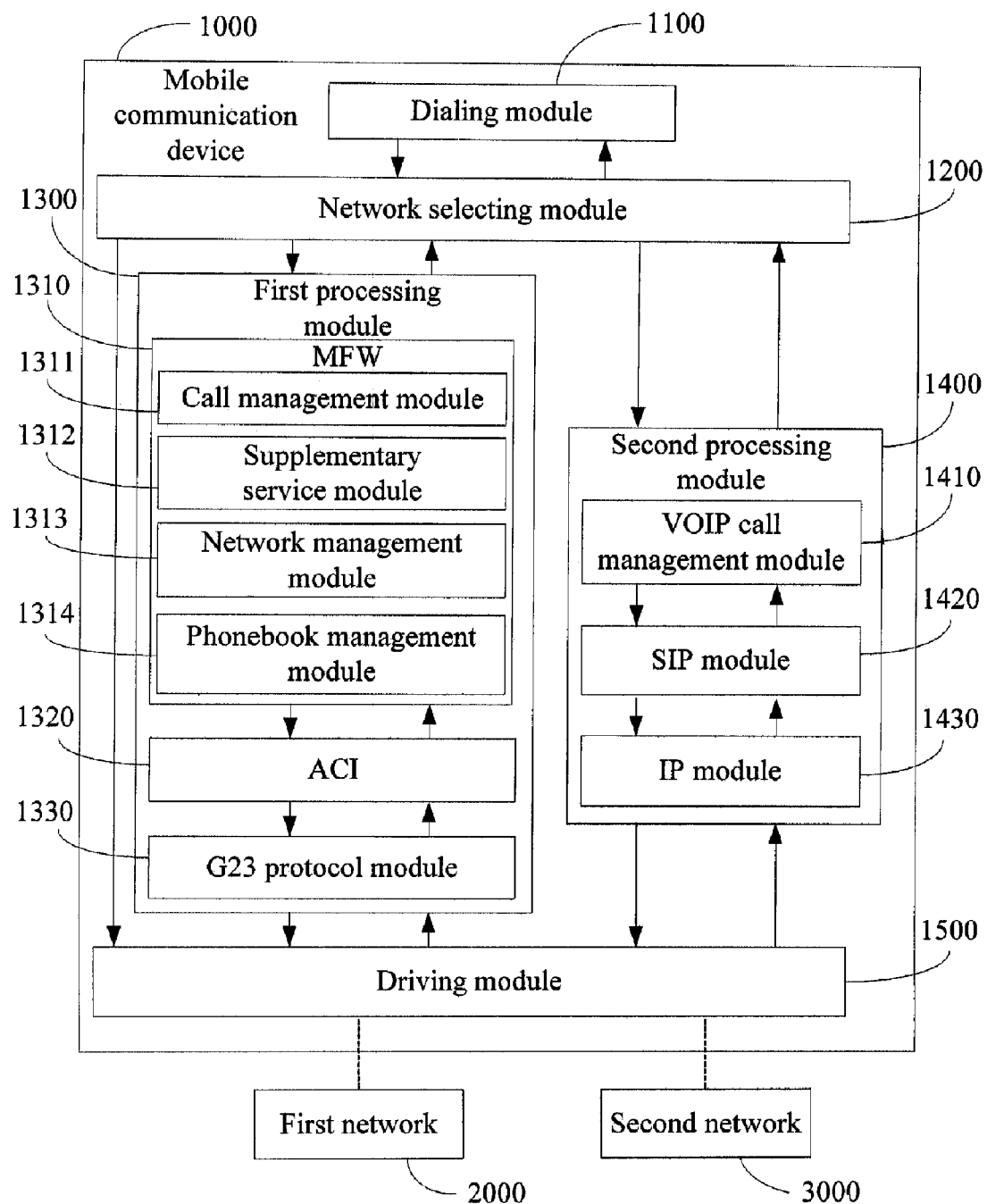
FIG. 1 is a schematic diagram of a dual mode mobile communication device according to an exemplary embodiment of the present invention, the mobile communication device including a network selecting module.

FIG. 1 is a schematic diagram of a dual mode mobile communication device according to an exemplary embodiment of the present invention. The mobile communication device 1000 is associated with a first network 2000 and a second network 3000. The mobile communication device 1000 communicates with other remote communication devices (not shown) via the first network 2000 or the second network 3000. The first network 2000 may be a Global System for Mobile communication (GSM) network. The second network 3000 may be a Voice Over Internet Protocol (VOIP) network. The mobile communication device 1000 includes a dialing module 1100, a network selecting module 1200, a first processing module 1300, a second processing module 1400, and a driving module 1500. The dialing module 1100 receives an input phone number and transmits the input phone number to the network selecting module 1200. Preferably, the network selecting module 1200 automatically selects one of the GSM network 2000 and the VOIP network 3000 for communication according to a current network status of those networks. Then, the network selecting module 1200 transmits the input phone number to a corresponding processing module of the selected communication network 2000 or 3000. For example, if the network selecting module 1200 selects the GSM network 2000, the input phone number is transmitted to the first processing module 1300. Alternatively, if the VOIP network 3000 is selected, then the input phone number is transmitted to the second processing module 1400.

When the GSM network 2000 is selected, the first processing module 1300 receives the input phone number, and converts the input phone number into a call packet. The first processing module 1300 then transmits the call packet to the GSM network 2000 via the driving module 1500. The first processing module 1300 also detects a network status of the GSM network 2000 via the driving module 1500, and transmits the network status of the GSM network 2000 to the network selecting module 1200. In the exemplary embodiment, an exemplary first processing module 1300 is a GSM processing module, which is referred to as GSM processing module 1300 hereinafter. The GSM processing module 1300 preferably includes a Man Machine Interface Frame (MFW) 1310, an AT (attention) Command Interpreter (ACI) 1320, and a GSM layer 2/layer 3 (G23) protocol module 1330.

The MFW 1310 manages GSM calls, and preferably includes a call management module 1311, a supplementary service module 1312, a network management module 1313, and a phonebook management module 1314. The call management module 1311 receives the input phone number transmitted by the network selecting module 1200, updates a status of the dual mode mobile phone to a dialing status, and sends an AT (attention) command and the input phone number to the ACI 1320. The supplementary service module 1312 provides telephone services such as call holding, call forwarding, call waiting, and so on. The network management module 1313 detects the network status of the GSM network 2000 via the AC 1320, the G23 protocol module 1330, and the driving module 1500. The network status of the GSM network 2000 indicates whether the GSM network 2000 is in or out of service. The network management module 1313 then transmits the network status to the network selecting module 1200. The phonebook management module 1314 manages a phone call history. For example, the phonebook management module 1314 can manage incoming-call phone numbers, dialed numbers, received phone numbers, and unanswered call phone numbers.

The ACI 1320 receives the AT command and the input phone number. The ACT 1320 also converts the input phone number into call data, and transmits the call data to the G23 protocol module 1330. The G23 protocol module 1330 receives the call data, converts the call data into a call packet, and transmits the call packet to the GSM network 2000 via the driving module 1500.

When the VOIP network 3000 is selected, the second processing module 1400 receives the input phone number, converts the input phone number into another call packet, and transmits the call packet to the VOIP network 3000 via the driving module 1500. The second processing module 1400 detects a network status of the VOIP network 3000, and transmits the network status to the network selecting module 1200. In the exemplary embodiment, a VOIP proceeding module is an exemplary second proceeding module 1400, and is referred to as the VOIP proceeding module 1400 hereinafter. The VOIP proceeding module 1400 includes a VOIP call management module 1410, a Session Initiation Protocol (SIP) module 1420, and an Internet Protocol (IP) module 1430.

The VOIP call management module 1410 manages VOIP calls. The VOIP call management module 1410 receives the input phone number, and transmits the input phone number to the SIP module 1420. The VOIP call management module 1410 detects the network status of the VOIP network 3000 via the SIP module 1420, the IP module 1430, and the driving module 1500. The VOIP call management module 1410 then transmits the network status of the VOIP network 3000 to the network selecting module 1200. The network status of the VOIP network 3000 indicates whether the VOIP network 3000 is in or out of service.

The SIP module 1420 receives the input phone number, converts the input phone number into an SIP packet, and transmits the SIP packet to the IP module 1430. The IP module 1430 receives the SIP packet, converts the SIP packet into an IP packet, and transmits the IP packet to the VOIP network 3000 via the driving module 1500. In this way, the mobile communication device 1000 communicates with other remote communication devices via the GSM network 2000 or the VOIP network 3000.

Figure 2:
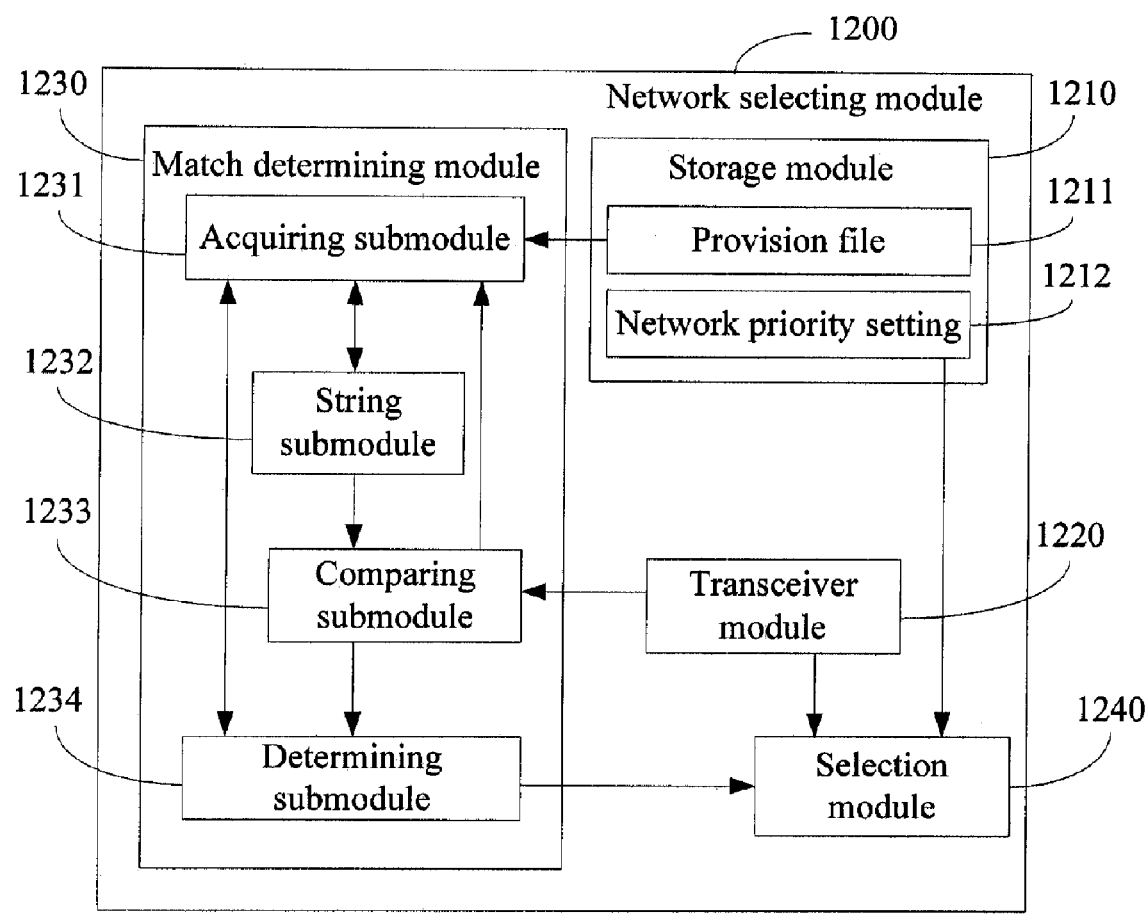
FIG. 2 is a schematic diagram of the network selecting module of FIG. 1.

FIG. 2 is a schematic diagram showing exemplary details of the network selecting module 1200. In the exemplary embodiment, the network selecting module 1200 includes a storage module 1210, a transceiver module 1220, a match determining module 1230, and a selection module 1240.

Figure 3:
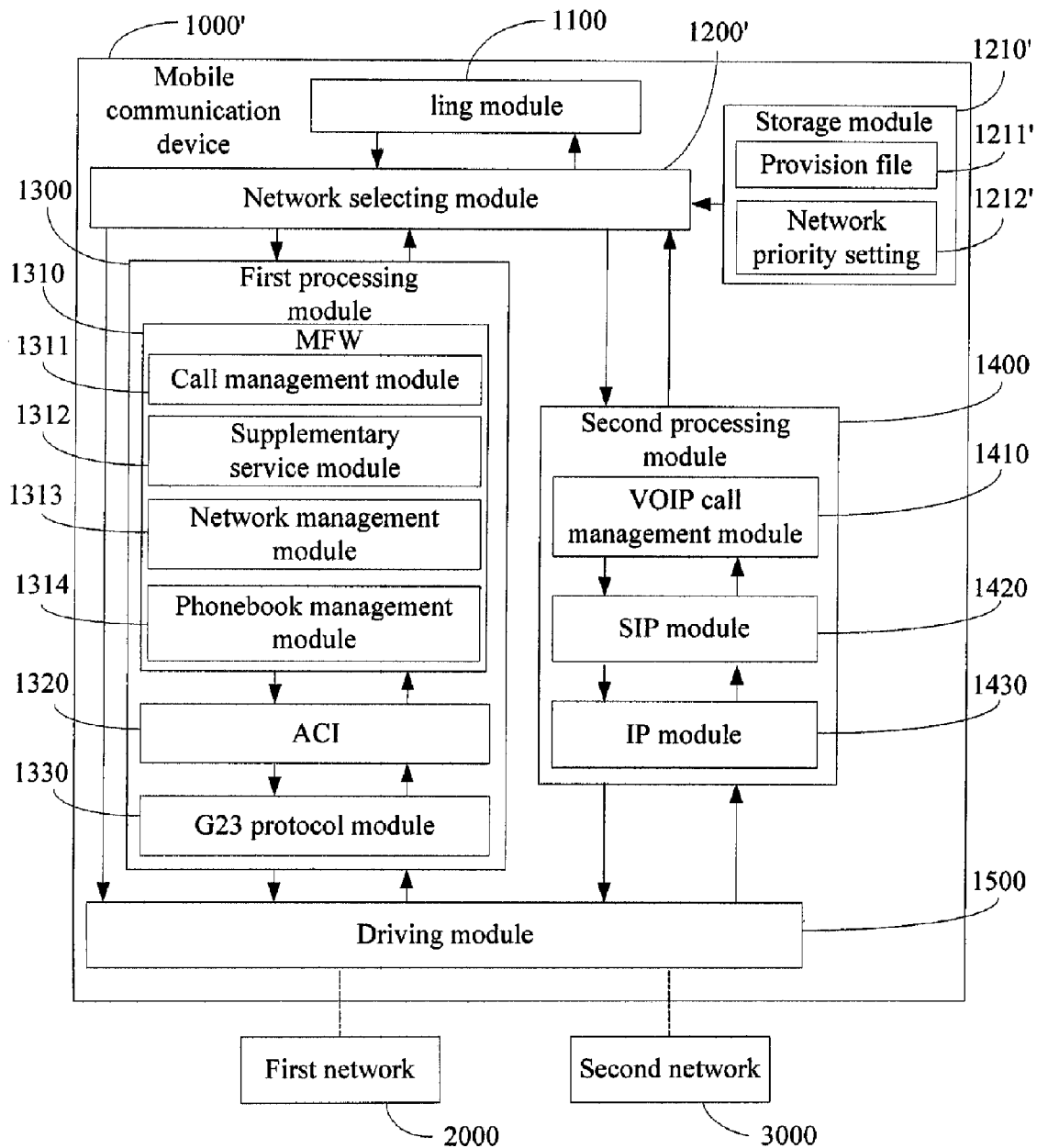
FIG. 3 is a schematic diagram of a dual mode mobile communication device according to another exemplary embodiment of the present invention.

In another exemplary embodiment, the storage module 1210 can be omitted from the network selecting module 1200. Referring to FIG. 3, in a further exemplary embodiment, a storage module 1210' can be provided in a mobile communication device 1000'. The storage module 1210' is provided outside of a network selecting module 1200'.

When the storage module 1210 or 1210' is provided, the storage module 1210, 1210' stores a data file such as a provision file 1211, 1211', and also stores a network priority setting 1212, 1212'. In the exemplary embodiments, the provision file 1211, 1211' includes a plurality of digit map strings. Each of the digit map strings includes a prefix field and a length field. The prefix field of the digit map string has a format of m characters, for example, 202, 360, for matching with a prefix of the input phone number. The length field of the digit map string has a format of either a numeric value 0 (ignore string length) or n characters, for example, 0, 10, for matching with the number of digits in the input phone number. Therefore, a format of the digit map string is: Digit–map–x=prefix, length; for example, Digit–map–1=202, 10; Digit–map–2=360, 10. It should be noted that the format of the digit map string could be modified according to practical needs and design requirements. The network priority setting 1212, 1212' indicates a network priority predefined by users.

The transceiver module 1220 receives the input phone number from the dialing module 1100, and transmits the input phone number to the match determining module 1230. The transceiver module 1220 receives a current network status (in service or out of service) for the communication networks 2000, 3000, and transmits the current network status to the selection module 1240. In the exemplary embodiment, the transceiver module 1220 receives the network status of the GSM network 2000 from the GSM processing module 1300, and receives the network status of the VOIP network 3000 from the VOIP processing module 1400, and then transmits the network statuses of the communication networks 2000, 3000 to the selection module 1240.

The match determining module 1230 receives the input phone number from the transceiver module 1220, acquires the digit map strings from the provision file 1211, 1211' of the storage module 1210, 1210', and determines whether the input phone number matches parameters defined by one of the digit map strings. In the exemplary embodiment, the match determining module 1230 includes an acquiring sub-module 1231, a string sub-module 1232, a comparing sub-module 1233, and a determining sub-module 1234.

The acquiring sub-module 1231 acquires a digit map string from the provision file 1211, 1211' of the storage module 1210, 1210', and transmits the digit map string to the string sub-module 1232. The acquiring sub-module 1231 further determines whether the currently accessed digit map string is the last string of the provision file 1211, 1211'. If not, the acquiring sub-module 1231 acquires a next digit map string. Otherwise, the acquiring sub-module 1231 informs the determining module 1234 that no match is found between the input phone number and the parameters defined by the digit map strings.

The string sub-module 1232 receives the digit map string from the acquiring sub-module 1231, and determines whether either of the prefix field and the length field of the currently accessed digit map string is a null field. The string sub-module 1232 converts data in the length field of the digit map string into a decimal number p. In the exemplary embodiment, if data in the length field is a numeric value 0, the number p is equal to the number 0; and if data in the length field is not a numeric value 0, the number p is equal to the number n in the length field of the digit map string. If either the prefix field or the length field of the digit map string is a null field, the string sub-module 1232 informs the acquiring module 1231 of this information. On the other hand, if neither of the prefix field and the length field is a null field, the string sub-module 1232 transmits the digit map string and the number p to the comparing sub-module 1233. In another exemplary embodiment, the string sub-module 1232 may transmit the prefix field of the digit map string and the number p to the comparing sub-module 1233.

The comparing sub-module 1233 receives the input phone number from the transceiver module 1220, receives the digit map string and the number p from the string sub-module 1232, and determines whether the input phone number matches the parameters defined by the digit map string. In the exemplary embodiment, the comparing sub-module 1233 first determines whether a match is found between the prefix of the input phone number and the prefix field of the digit map string. The detailed steps involved are stated below. The first m digits in the input phone number are compared with the prefix field of the digit map string. If the comparison is not a match, the comparing sub-module 1233 informs the acquiring sub-module 1231 of this result. If the comparison for the prefix field is a match, the comparing sub-module 1233 then determines whether the number p is equal to the number 0. If the number p is equal to the number 0, then the comparing sub-module 1233 informs the determining sub-module 1234 that the input phone number is matched with the parameters of the currently accessed digit map string. If the number p is not equal to the number 0, then the comparing sub-module 1233 further determines whether the number p is equal to the number of digits in the input phone number. If the number p is not equal to the number of digits in the input phone number, the comparing sub-module 1233 informs the acquiring sub-module 1231 about this result. If the number p is equal to the number of digits in the input phone number, the comparing sub-module 1233 informs the determining sub-module 1234 that the input phone number is matched with the parameters defined by the currently accessed digit map string. The determining sub-module 1234 determines a match result based on information from the acquiring sub-module 1231 and the comparing sub-module 1233, and then sends the match result to the selection module 1240.

The selection module 1240 acquires a network priority setting from the network priority setting 1212, 1212' of the storage module 1210, 1210', receives the match result from the determining sub-module 1234, and receives the current network status from the transceiver module 1220. Afterward, the selection module 1240 selects a communication network 2000 or 3000 based on the above information. More particularly, in the exemplary embodiment, the selection module 1240 selects a preferred communication network 2000 or 3000 according to the network priority setting, the match result, and the current network status.

A table of an exemplary selection rule is shown in FIG. 4. As can be seen from FIG. 4, when both the GSM network 2000 and the VOIP network 3000 are out of service, no communication network is selected as the preferred communication network. When the GSM network 2000 is in service, and the VOIP network 3000 is out of service, the GSM network 3000 is selected. When the GSM network 2000 is out of service, and the VOIP network 3000 is in service, the VOIP network 3000 is selected. When both of the GSM network 2000 and the VOIP network 3000 are in service, the preferential communication network is selected according to the network priority setting and the match result. In the exemplary embodiment, when both of the GSM network 2000 and the VOIP network 3000 are in service, and the network priority setting is set to prefer GSM network 2000, then the GSM network 2000 is selected. When both of the GSM network 2000 and the VOIP network 3000 are in service, and the network priority setting is set to prefer the VOIP network 3000, the GSM network 2000 is selected if the match result is positive, and the VOIP network 3000 is selected if the match result is negative. For example, a match would identify a service that is provided by the GSM network but not by the VOIP network. It should be noted that the rule for selecting the preferred communication network as between the GSM network 2000 and the VOIP network 3000 can be modified according to practical needs and design requirements. Further, although only the GSM network 2000 and the VOIP network 3000 are shown in the drawings and described above, the various described embodiments can be implemented so that one of three or more communication networks can be selected.

Figure 5:
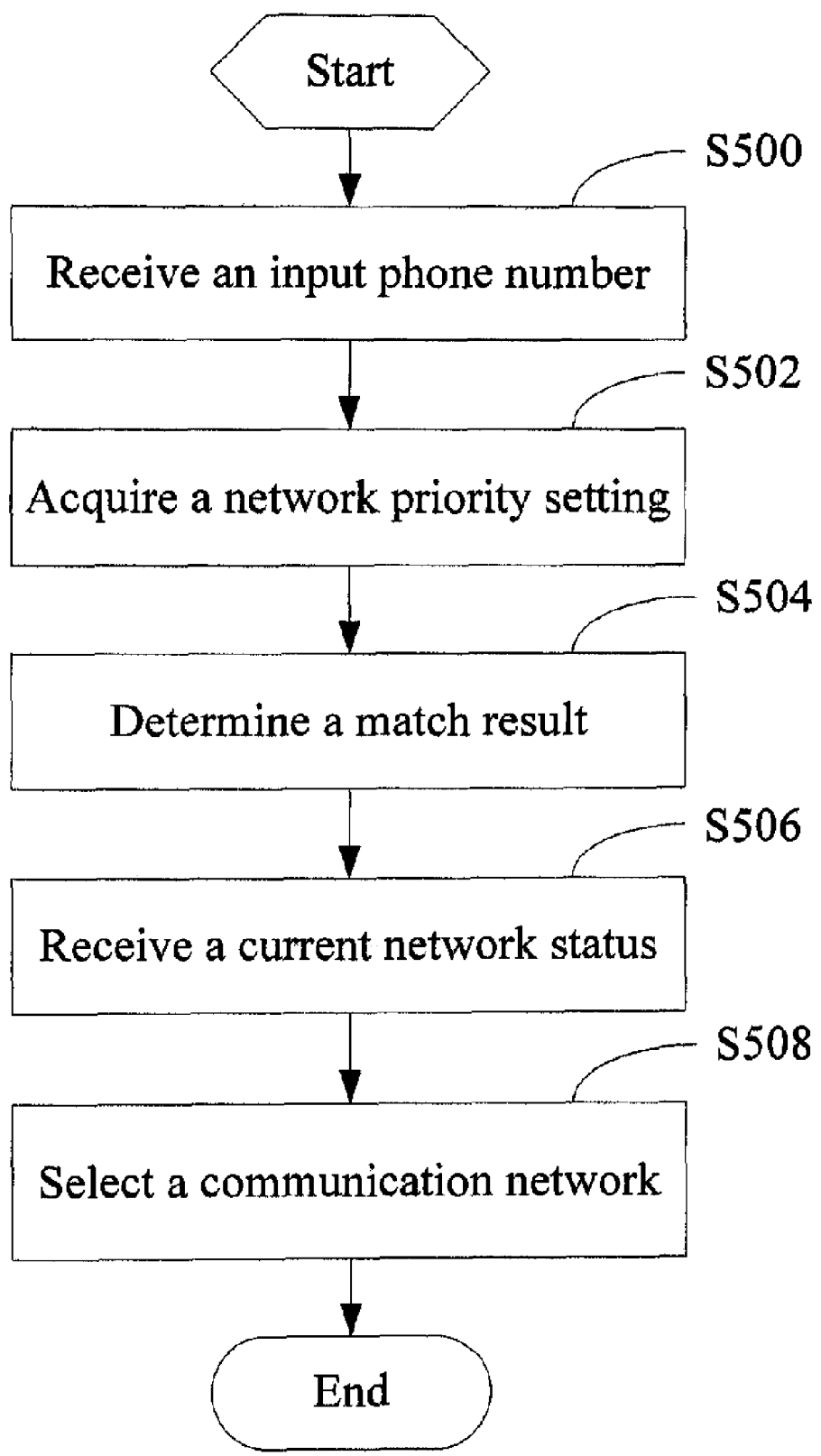
FIG. 5 is a flowchart illustrating an exemplary network selection method implemented in the mobile communication device of FIG. 1.

FIG. 5 is a flowchart illustrating an exemplary network selection method implemented in the mobile communication device 1000 shown in FIG. 1. In the exemplary embodiment, when a user wants to place a phone call using the mobile communication device 1000, one of the GSM network 2000 and the VOIP network 3000 is selected as the preferred communication network.

In step S500, the transceiver module 1220 of the network selecting module 1200 receives an input phone number from the dialing module 1100, and transmits the input phone number to the match determining module 1230. In step S502, the selection module 1240 acquires a network priority setting predefined by users from the network priority setting 1212 of the storage module 1200.

In step S504, the match determining module 1230 determines a match result, and transmits the match result to the selection module 1240. In the exemplary embodiment, the match determining module 1230 receives the input phone number from the transceiver module 1220, acquires digit map strings from the provision file 1211 of the storage module 1210, and determines whether the input phone number matches the parameters defined by one of the digit map strings. The specific steps of a match determining procedure of the match determining module 1230 will be described hereinafter with reference to FIG. 6. In step S506, the transceiver module 1220 receives a current network status, and transmits the current network status to the selection module

1240. In the exemplary embodiment, the current network status includes the service availability of the GSM network 2000, which can be in service or out of service, and the service availability of the VOIP network 3000, which can be in service or out of service.

In step S508, the selection module 1240 receives the match result and the current network status, and selects a communication network according to the network priority setting, the match result, and the current network status. In the exemplary embodiment, the network selecting rule of the selection module 1240 as shown in FIG. 4 is used.

Figure 6:
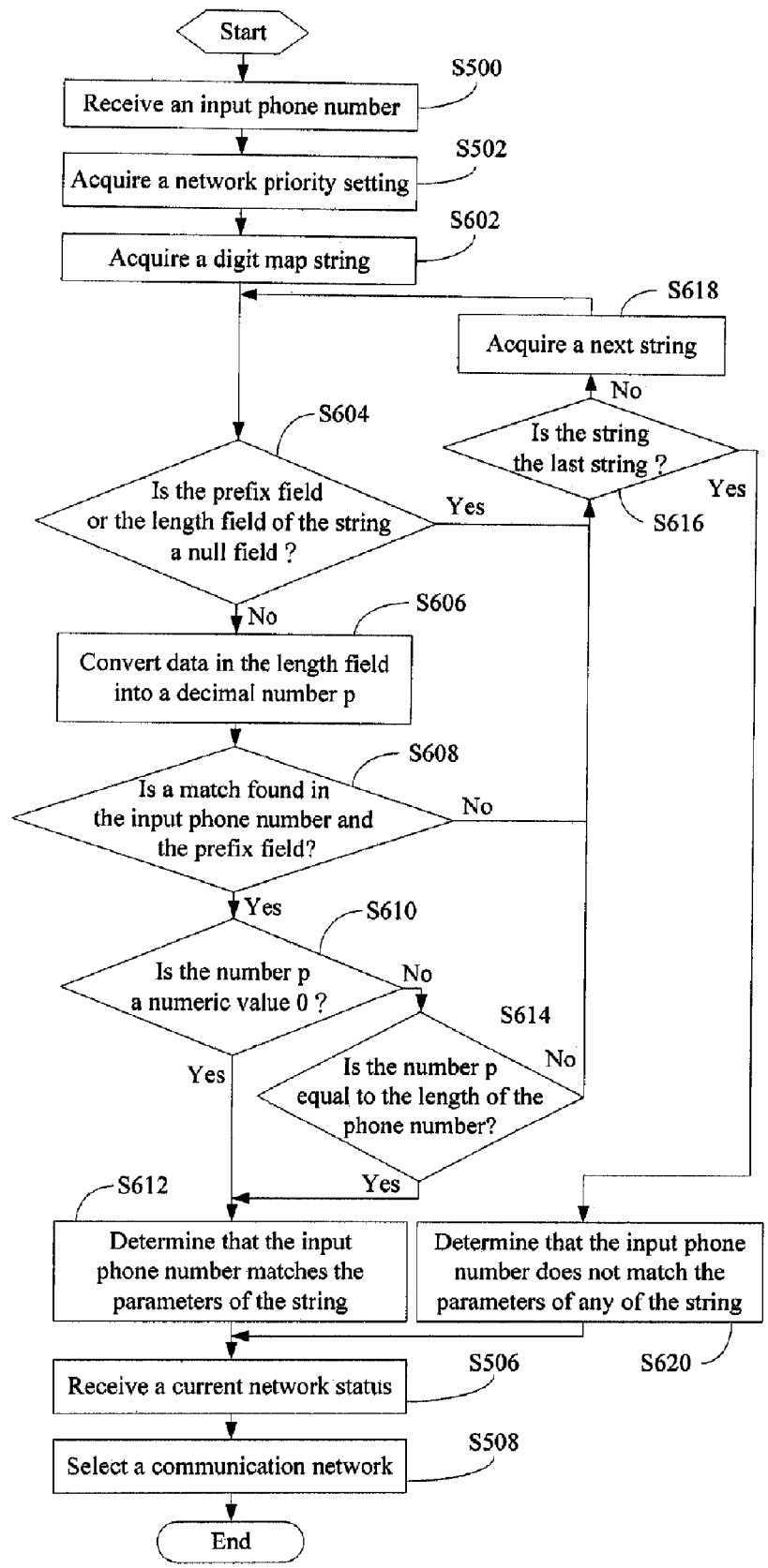
FIG. 6 is a flowchart illustrating the method of FIG. 5, but showing exemplary details of one of the steps thereof, namely determining a match result.

FIG. 6 is a flowchart illustrating the method of FIG. 5, but showing exemplary details of step S504 thereof, namely determining a match result.

In step S500, the transceiver module 1220 receives an input phone number, and transmits the input phone number to the comparing sub-module 1233 of the match determining module 1230. In step S502, the selection module 1240 acquires a network priority setting from the network priority setting 1212 of the storage module 1210. In step S602, the acquiring sub-module 1231 of the match determining module 1230 acquires a digit map string from the provision file 1211 of the storage module 1210, and transmits the digit map string to the string sub-module 1232. In the exemplary embodiment, the provision file 1211 includes a plurality of digit map strings, and each of the digit map strings includes a prefix field and a length field. The prefix field of the digit map string includes m characters, and the length field of the digit map string includes the number 0 or n characters.

In step S604, the string sub-module 1232 receives the digit map string, and determines whether the prefix field or the length field of the digit map string is a null field.

If one of the prefix field and the length field of the digit map string is a null field, then step S616 is next. In step S616, the acquiring sub-module 1231 determines whether the currently accessed digit map string is the last string in the provision file 1211, 1211'. If the currently accessed digit map string is not the last string, then step S618 is next. In step S618, the acquiring sub-module 1231 acquires a next digit map string from the provision file 1211, 1211'. Otherwise, if the currently accessed digit map string is the last string, in step S620, the determining sub-module 1234 determines that the input phone number does not match the parameters of any of the digit map strings, and accordingly transmits a negative match result to the selection module 1240, and then step S506 is next. In step S506, the transceiver module 1220 receives a current network status, and transmits the current network status to the selection module 1240. In step S508, the selection module 1240 receives the match result and the current network status, and then selects a communication network 2000 or 3000 according to the network priority setting, the match result, and the current network status.

If in step S604 neither the prefix field nor the length field of the digit map string is a null field, then in step S606, the string sub-module 1232 converts data in the length field of the digit map string into a decimal number p, and transmits the currently accessed digit map string and the number p to the comparing sub-module 1233. In the exemplary embodiment, if data in the length field is the number 0, the number p is equal to 0; and if data in the length field is not the number 0, the number p is equal to the number n.

In step S608, the comparing sub-module 1233 determines whether a match is found in the input phone number and the prefix field of the currently accessed digit map string. In the exemplary embodiment, the comparing sub-module 1233 receives the input phone number from the transceiver module 1220, receives the digit map string and the number p from the string sub-module 1232, and then determines whether the input phone number has a match with the prefix field of the digit map string. The determination is made according to the following sub-steps. The comparing sub-module 1232 obtains the first m characters of the input phone number, and determines whether the first m characters of the input phone number are the same as the prefix field of the currently accessed digit map string.

If the first m characters of the input phone number are not the same as the prefix field of the currently accessed digit map string, the input phone number is determined to not match the prefix field of the digit map string, and the process goes to step S616.

If the first m characters of the input phone number are the same as the prefix field of the digit map string, the input phone number is determined to match the prefix field of the digit map string, and in step S610, the comparing sub-module 1233 goes on to determine whether the number p is a numeric value 0.

If the number p is a numeric value 0, in step S612, the determining sub-module 1234 determines that the input phone number matches the parameters of the digit map string, and transmits a positive match result to the selection module 1240.

If the number p is not a numeric value 0, in step S614, the comparing sub-module 1233 further determines whether the number p is equal to the number of digits in the input phone number. If not, the process goes to step S616. Otherwise, the process goes to step S612, and the determining sub-module 1234 determines that the input phone number matches the parameters of the digit map string, and transmits a positive match result to the selection module 1240.

In step S506, the transceiver module 1220 receives a current network status, and transmits the current network status to the selection module 1240.

In step S508, the selection module 1240 receives the match result and the current network status, and then selects a communication network 2000 or 3000 according to the network priority setting, the match result, and the current network status.

According to the description above, the network selecting module 1200 can automatically select the GSM network 2000 or the VOIP network 3000 as a preferred communication network according to the network priority setting, the match result, and the current network status. Therefore, the mobile communication device 1000 can automatically select a communication network according to the network status, and the quality of the communication is assured.

The foregoing disclosure of exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments, the specification may have presented the method and/or process of an embodiment as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile communication device for selecting a communication network from a plurality of different communication networks, comprising:
   a storage module, for storing a plurality of digit map strings and a network priority setting, wherein each of the plurality of digit map strings comprises a prefix field and a length field;
   a transceiver module, for receiving an input phone number and a current network status;
   a match determining module, for determining a match result between the input phone number and the digit map strings, the match determining module comprising:
      an acquiring sub-module for acquiring a currently accessed digit map string from the plurality of digit map strings, and determining whether the currently accessed digit map string is the last string of the plurality of digit map strings; and
      a string sub-module for determining whether the prefix field or the length field of the currently accessed digit map string is null, and converting the length field of the digit map string into a number if neither of the prefix field and the length field of the digit map string is a null field; and
   a selection module, for selecting a communication network among the plurality of different communication networks according to the network priority setting, the match result, and the current network status.

2. The device of claim 1, wherein the match determining module further comprises a comparing sub-module for determining whether the input phone number matches parameters defined by the currently accessed digit map string.

3. The device of claim 2, wherein the match determining module further comprises a determining sub-module for determining the match result according to the results determined by the acquiring sub-module and the comparing sub-module.

4. The device of claim 1, further comprising a dialing module for receiving the input phone number, and a driving module for transmitting a call packet.

5. The device of claim 4, further comprising a first processing module for converting the input phone number into the call packet, and transmitting the call packet to a first network via the driving module.

6. The device of claim 5, wherein the first processing module is a Global System for Mobile communication (GSM) processing module, and comprises a Man Machine Interface Framework (MFW) for managing GSM calls.

7. The device of claim 6, wherein the MFW comprises a call management module for receiving the input phone number, updating a call status of the mobile communication device to a calling status, and transmitting an AT command and the input phone number.

8. The device of claim 7, wherein the MFW further comprises an AT command Interpreter (ACI) for receiving the AT command and the input phone number, and converting the input phone number into call data.

9. The device of claim 8, wherein the first processing module further comprises a GSM layer/layer (G23) protocol module for converting the call data into the call packet, and transmitting the call packet to the GSM network via the driving module.

10. The device of claim 6, wherein the MFW comprises a network management module for detecting the network status of the GSM network via the driving module, and transmitting the network status of the GSM network to the network selecting module.

11. The device of claim 5, further comprising a second processing module for converting the input phone number into the call packet, and transmitting the call packet to a second network via the driving module.

12. The device of claim 11, wherein the second processing module is a Voice Over Internet Protocol (VOIP) processing module, and comprises a VOIP call management module for managing VOIP calls.

13. The device of claim 12, wherein the second processing module further comprises a Session Initiation Protocol (SIP) module for converting the input phone number into an SIP packet.

14. The device of claim 13, wherein the second processing module further comprises an Internet Protocol (IP) module for converting the SIP packet into an IP packet.

15. A method for selecting a communication network from a plurality of different communication networks, comprising:
   providing a plurality of digit map strings and a network priority setting, wherein each of the plurality of digit map strings comprises a prefix field and a length field;
   receiving an input phone number;
   acquiring the network priority setting;
   determining a match result according to the input phone number and the plurality of digit map strings, the determining step comprising acquiring a currently accessed digit map string from the plurality of digit map strings and determining whether the input phone number matches parameters defined by the currently accessed digit map string, wherein the step of determining whether the input phone number matches the parameters defined by the currently accessed digit map string comprises:
      determining whether one of the prefix field and the length field of the currently accessed digit map string is a null field;
      converting the length field of the currently accessed digit map string into a decimal number, if neither of the prefix field and the length field is a null field;
      determining whether the prefix of the input phone number matches the prefix field of the currently accessed digit map string;
      determining whether the input phone number is 0, if the input phone number matches the prefix of the currently accessed digit map string; and
      determining that the input phone number matches the currently accessed digit map string, if the input phone number is 0;
   receiving a current network status; and
   selecting a communication network according to the network priority setting, the match result, and the current network status.

16. The method of claim 15, wherein the step of determining the match result according to the input phone number and the plurality of digit map strings further comprises:
   determining whether the currently accessed digit map string is the last string of the plurality of digit map strings, if the input phone number does not match the currently accessed digit map string;
   acquiring a next digit map string from the plurality of digit map strings and determining whether the input phone number matches the parameters defined by the next digit map string, if the currently accessed digit map string is not the last string of the plurality of digit map strings; and determining that the input phone number does not match the parameters defined by any of the digit map strings, if the currently accessed digit map string is the last string of the plurality of digit map strings.

17. The method of claim 15, wherein the step of determining whether the input phone number matches the parameters defined by the currently accessed digit map string further comprises:

determining that the input phone number does not match the parameters defined by the currently accessed digit map string, if one of the prefix field and the length field of the currently accessed digit map string field is a null field.

18. The method of claim 15, wherein the step of determining whether the input phone number matches the parameters defined by the currently accessed digit map string further comprises:

determining that the input phone number does not match the parameters defined by the currently accessed digit map string, if the prefix of the input phone number does not match the prefix field of the currently accessed digit map string.

19. The method of claim 15, wherein the step of determining whether the input phone number matches the parameters defined by the currently accessed digit map string further comprises:

determining whether the decimal number is equal to the number of digits in the input phone number, if the decimal number is not a numeric value 0;

determining that the input phone number matches the parameters defined by the currently accessed digit map string, if the decimal number is equal to the number of digits in the input phone number; and determining that the input phone number does not match the parameters defined by the currently accessed digit map string, if the decimal number does not equal the number of digits in the input phone number.

* * * * *